US006999925B2

(12) United States Patent
Fischer et al.

(10) Patent No.: US 6,999,925 B2
(45) Date of Patent: Feb. 14, 2006

(54) METHOD AND APPARATUS FOR PHONETIC CONTEXT ADAPTATION FOR IMPROVED SPEECH RECOGNITION

(75) Inventors: Volker Fischer, Leimen (DE); Siegfried Kunzmann, Heidelberg (DE); Eric-W. Janke, Winchester (GB); A. Jon Tyrrell, Chandlers Rord Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 698 days.

(21) Appl. No.: 10/007,990

(22) Filed: Nov. 13, 2001

(65) Prior Publication Data

US 2002/0087314 A1 Jul. 4, 2002

(30) Foreign Application Priority Data

Nov. 14, 2000 (EP) .................................. 00124795

(51) Int. Cl.
*G10L 15/06* (2006.01)
*G10L 15/08* (2006.01)
*G10L 15/27* (2006.01)
*G10L 15/18* (2006.01)

(52) U.S. Cl. ...................... 704/243; 704/255; 704/257; 704/236

(58) Field of Classification Search ................ 704/244, 704/257, 10, 8
See application file for complete search history.

(56) References Cited

U.S. PATENT DOCUMENTS 5,794,192 A * 8/1998 Zhao .......................... 704/244
5,799,277 A * 8/1998 Takami ....................... 704/256
6,014,624 A * 1/2000 Raman ....................... 704/243
6,173,076 B1 * 1/2001 Shinoda ...................... 382/226
6,324,510 B1 * 11/2001 Waibel et al. .............. 704/256
6,334,102 B1 * 12/2001 Lewis et al. ................ 704/255
6,571,208 B1 * 5/2003 Kuhn et al. ................. 704/250
6,711,541 B1 * 3/2004 Kuhn et al. ................. 704/242
6,718,305 B1 * 4/2004 Hab-Umbach .............. 704/245

FOREIGN PATENT DOCUMENTS

WO WO99/54869 10/1999

OTHER PUBLICATIONS

Rajput et al., "Adapting Phonetic Decision Trees Between Languages for Continuous Speech Recognition", In ICSLP-2000, Oct. 16-20, 2000, vol. 3, pp. 850-852.*

Schultz et al., "Language Portability in Acoustic Modeling", Proceedings of the Workshop on Multilingual Speech Communication (MSC-2000), Kyoto, Japan, Oct. 2000, pp. 59-64.*

Schultz et al., "Language Adaptive LVCSR through Polyphone Decision Tree Specialization", Workshop on Multi-lingual Iteroperability in Speech Technology (MIST-1999), Leusden, The Netherlands, Sep. 1999, pp. 85-90.*

(Continued)

*Primary Examiner*—W. R. Young
*Assistant Examiner*—Brian Albertalli
(74) *Attorney, Agent, or Firm*—Akerman Senterfitt

(57) ABSTRACT

The present invention provides a computerized method and apparatus for automatically generating from a first speech recognizer a second speech recognizer which can be adapted to a specific domain. The first speech recognizer can include a first acoustic model with a first decision network and corresponding first phonetic contexts. The first acoustic model can be used as a starting point for the adaptation process. A second acoustic model with a second decision network and corresponding second phonetic contexts for the second speech recognizer can be generated by re-estimating the first decision network and the corresponding first phonetic contexts based on domain-specific training data.

29 Claims, 1 Drawing Sheet

OTHER PUBLICATIONS

Schultz et al., "Polyphone Decision Tree Specialization for Language Adaptation", ICASSP-2000, Istanbul, Turkey, Jun. 2000.*

Fritsch, J., et al., "Effective Structural Adaptation of LVCSR Systems to Unseen Domains Using Hierarchical Connectionist Acoustic Models," ICSLP '98, P. 754, (Oct. 1998).

Fritsch, J., "ACID/HNN: A Framework for Hierarchical Connectionist Acoustic Modeling," Proc. of IEEE ASRU Workshop, Santa Barbara 1997, pp. 164-171, (Dec. 14-17, 1997).

R. Singh, et al., *Domain Adduced State Tying For Cross-Domain Acoustic Modelling*, Proc. of the 6th Europ. Conf. on Speech Communication and Technology, Budapest (1999).

* cited by examiner

METHOD AND APPARATUS FOR PHONETIC CONTEXT ADAPTATION FOR IMPROVED SPEECH RECOGNITION

CROSS-REFERENCE TO RELATED APPLICATIONS

This application claims the benefit of European Application No. 00124795.6, filed Nov. 14, 2000 at the European Patent Office.

BACKGROUND OF THE INVENTION 1.1 Technical Field

The present invention relates to speech recognition systems, and more particularly, to a computerized method and apparatus for automatically generating from a first speech recognizer a second speech recognizer which can be adapted to a specific domain.

1.2 Description of the Related Art

To achieve necessary acoustic resolution for different speakers, domains, or other circumstances, today's general purpose large vocabulary continuous speech recognizers have to be adapted to these different situations. To do so, the speech recognizer must determine a huge number of different parameters, each of which can control the behavior of the speech recognizer. For instance, Hidden Markov Model (HMM) based speech recognizers usually employ several thousands of HMM states and several tens of thousands of multidimensional elementary probability density functions (PDFS) to capture the many variations of naturally spoken human speech. Therefore, the training of a highly accurate speech recognizer requires the reliable estimation of several millions of parameters. This is not only a time-consuming process, but also requires a substantial amount of training data.

It is well known that the recognition accuracy of a speech recognizer decreases significantly if the phonetic contexts and—in consequence of the changing phonetic contexts—pronunciations observed in the training data do not properly match those of the intended application. This is especially true when dealing with dialects or non-native speakers, but also can be observed when switching to other different domains, for example within the same language or to other dialects. Commercially available speech recognition products try to solve this problem by requiring each individual end user to enroll in the system. Accordingly, the speech recognizer can perform a speaker-dependent re-estimation of acoustic model parameters.

Large vocabulary continuous speech recognizers capture the many variations of speech sounds by modelling context dependent sub-word units, such as phones or triphones, as elementary HMMs. Statistical parameters of such models are usually estimated from several hundred hours of labelled training data. While this allows a high recognition accuracy if the training data sufficiently represents the task domain, it can be observed that recognition accuracy significantly decreases if phonetic contexts or acoustic model parameters are poorly estimated due to some mismatch between the training data and the intended application.

Since the collection of a large amount of training data and the subsequent training of a speech recognizer is both expensive and time consuming, the adaptation of a (general purpose) speech recognizer to a specific domain is a promising method to reduce development costs and time to market. Conventional adaptation methods, however, either simply provide a modification of the acoustic model parameters or—to a lesser extent—select a domain specific subset from the phonetic context inventory of the general recognizer.

Facing both the industry's growing interest in speech recognizers for specific domains including specialized application tasks, language dialects, telephony services, or the like, and the important role of speech as an input medium in pervasive computing, there is a definite need for improved adaptation technologies for generating new speech-recognizers. The industry is searching for technologies supporting the rapid development of new data files for speaker (in-) dependent, specialized speech recognizers having improved initial recognition accuracy, and which require reduced customization efforts whether for individual end users or industrial software vendors.

SUMMARY OF THE INVENTION

One object of the invention disclosed herein is to provide for fast and easy customization of speech recognizers to a given domain. It is a further objective to provide a technology for generating specialized speech recognizers requiring reduced computation resources, for instance in terms of computing time and memory footprints. The objectives of the invention are solved by the independent claims. Further advantageous arrangements and embodiments of the invention are set forth in the respective dependent claims.

The present invention relates to a computerized method and apparatus for automatically generating from a first speech recognizer a second speech recognizer which can be adapted to a specific domain. The first speech recognizer includes a first acoustic model with a first decision network and corresponding first phonetic contexts. The present invention suggests using the first acoustic model as a starting point for the adaptation process. A second acoustic model with a second decision network and corresponding second phonetic contexts for the second speech recognizer can be generated by re-estimating the first decision network and the corresponding first phonetic contexts based on domain-specific training data.

Advantageously, the decision network growing procedure preserves the phonetic context information of the first speech recognizer which was used as a starting point. In contrast to state of the art approaches, the present invention simultaneously allows for the creation of new phonetic contexts that need not be present in the original training material. Thus, rather than create a domain specific inventory from scratch according to the state of the art, which would require the collection of a huge amount of domain-specific training data, according to the present invention, the inventory of the general recognizer can be adapted to a new domain based on a small amount of adaptation data.

BRIEF DESCRIPTION OF THE DRAWINGS

There are shown in the drawings, embodiments which are presently preferred, it being understood, however, that the invention is not so limited to the precise arrangements and instrumentalities shown.

DETAILED DESCRIPTION OF THE INVENTION

Figure 1:
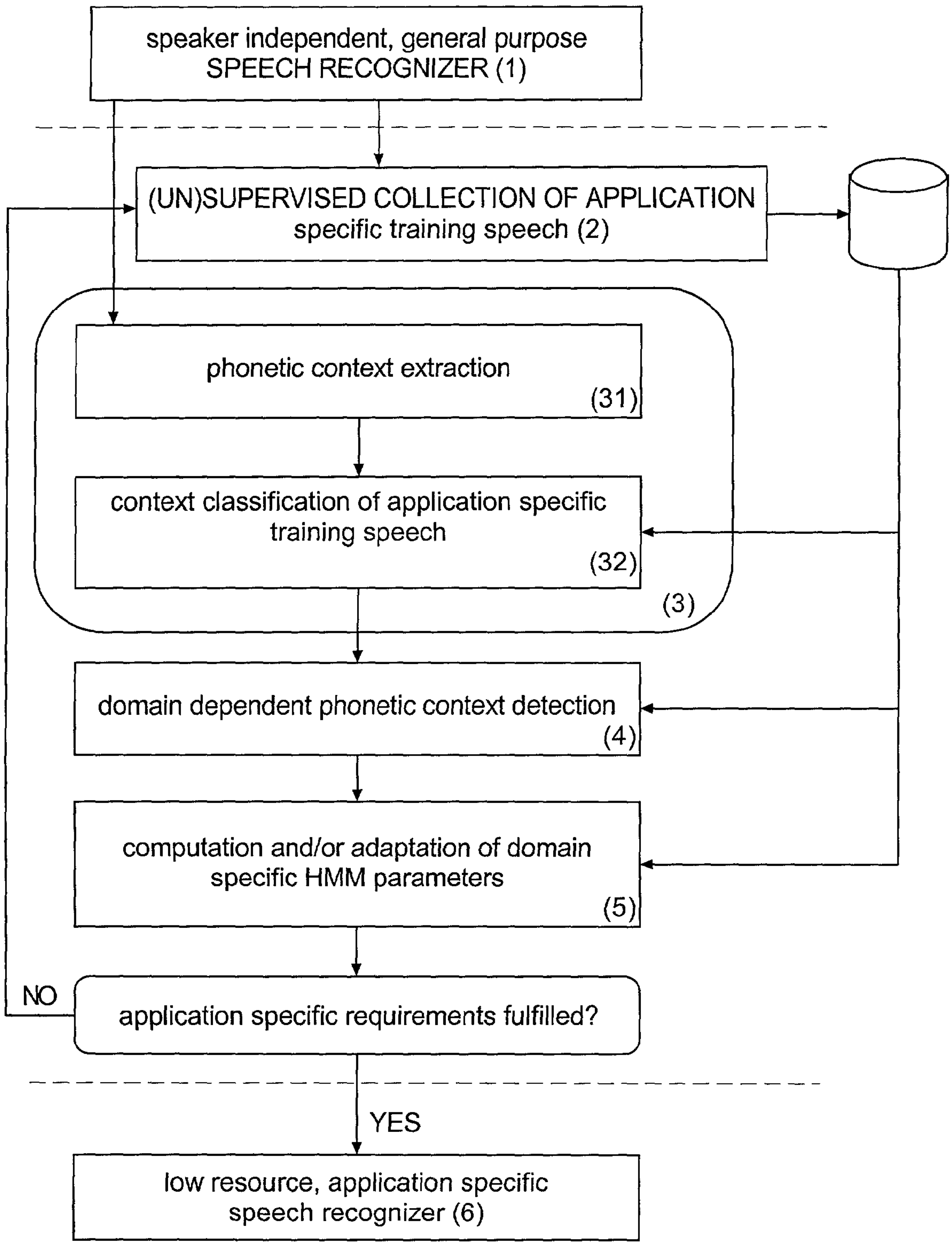
FIG. 1 is a flow diagram illustrating an exemplary structure for generating a speech recognizer which is tailored to a specific domain.

In the drawings and specification there is set forth a preferred embodiment of the invention, and although specific terms are used, the description thus given uses terminology in a generic and descriptive sense only and not for purposes of limitation.

The present invention can be realized in hardware, software, or a combination of hardware and software. Any kind of computer system—or other apparatus adapted for carrying out the methods described herein—is suited. A typical combination of hardware and software can be a general purpose computer system with a computer program that, when being loaded and executed, controls the computer system such that it carries out the methods described herein. The present invention also can be embedded in a computer program product, which comprises all the features enabling the implementation of the methods described herein, and which—when loaded in a computer system—is able to carry out these methods.

Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The present invention is illustrated within the context of the "ViaVoice" speech recognition system which is manufactured by International Business Machines Corporation, of Armonk, N.Y. Of course, the present invention can be used by any other type of speech recognition system. Moreover, although the present specification references speech recognizers which incorporate Hidden Markov Model (HMM) technology, the present invention is not limited only to such speech recognizers. Accordingly, the invention can be used with speech recognizers utilizing other approaches and technologies as well.

4.1 Introduction

Conventional large vocabulary continuous speech recognizers employ HMMs to compute a word sequence w with maximum a posteriori probability from a speech signal f. An HMM is a stochastic automaton $A=(\Pi,A,B)$ that operates on a finite set of states $S=\{S_1, \ldots, S_N\}$ and allows for the observation of an output each time t, $t=1, 2, \ldots, T$, a state is occupied. The initial state vector $$\Pi=[\Pi_i]=[P(s(1)=s_i)],\ 1 \leqq i \leqq N, \qquad \text{(eq. 1)}$$

gives the probabilities that the HMM is in state $s_i$ at time t=1, and the transition matrix $$A=[a_{ij}]=[P(s(t+1)=s_j|s(t)=s_i)],\ 1 \leqq i,j \leqq N, \qquad \text{(eq. 2)}$$

holds the probabilities of a first order time invariant process that describes the transitions from state $s_i$ to $s_j$. The observations are continuous valued feature vectors $x \in R$ derived from the incoming speech signal f, and the output probabilities are defined by a set of probability density functions (PDFS)

$$B=[b_i]=[p(x|s(t)=s_i],\ 1 \leqq i \leqq N. \qquad \text{(eq. 3)}$$

For any given HMM state $s_i$, the unknown distribution $p(x|s_i)$ of the feature vectors is approximated by a mixture of—usually gaussian—elementary probability density functions (pdfs)

$$\begin{aligned} p(x|s_i) &= \sum_{j \in M_i} (\omega_{ji} \cdot N(x|\mu_{ji}, \Gamma_{ji})) \\ &= \sum_{j \in M_i} (\omega_{ji} \cdot |2\pi\Gamma_{ji}|^{-1/2} \cdot \exp(-(x-\mu_{ji})_T \Gamma_{ji}^{-1}(x-\mu_{ji})/2)); \end{aligned} \qquad \text{(eq. 4)}$$

where $M_i$ is the set of Gaussians associated with state $s_i$. Furthermore, x denotes the observed feature vector, $\omega_{ji}$ is the j-th mixture component weight for the i-th output distribution, and $\mu_{ji}$ and $\Gamma_{ji}$ are the mean and covariance matrix of the j-th Gaussian in state $s_i$.

Large vocabulary continuous speech recognizers employ acoustic sub-word units, such as phones or triphones, to ensure the reliable estimation of a large number of parameters and to allow a dynamic incorporation of new words into the recognizer's vocabulary by the concatenation of sub-word models. Since it is well known that speech sounds vary significantly with respect to different acoustic contexts, HMMs (or HMM states) usually represent context dependent acoustic sub-word units. Moreover, since both the training vocabulary (and thus the number and frequency of phonetic contexts) and the acoustic environment (e.g. background noise level, transmission channel characteristics, and speaker population) will differ significantly in each target application, it is the task of the further training procedure to provide a data driven identification of relevant contexts from the labeled training data.

In a bootstrap procedure for the training of a speech recognizer, according to the state of the art, a speaker independent, general purpose speech recognizer is used for the computation of an initial alignment between spoken words and the speech signal. In this process, each frame's feature vector is phonetically labeled and stored together with its phonetic context, which is defined by a fixed but arbitrary number of left and/or right neighboring phones. For example, the consideration of the left and right neighbor of a phone $P_0$ results in the widely used (crossword) triphone context $(P_{-1}, P_0, P_{+1})$.

Subsequently, the identification of relevant acoustic contexts (i.e. phonetic contexts that produce significantly different acoustic feature vectors) is achieved through the construction of a binary decision network by means of an iterative split-and-merge procedure. The outcome of this bootstrap procedure is a domain independent general speech recognizer. For that purpose some sets $Q_i=\{P_1, \ldots, P_j\}$ of language and/or domain specific phone questions are asked about the phones at positions $K_{-m}, \ldots, K_{-1}, K_{+1}, K_{+m}$ in the phonetic context string. These questions are of the form: "Is the phone in position $K_j$ in the set $Q_i$ ?", and split a decision network node n into two successors, one node $n_L$ (L for left side) that holds all feature vectors that give rise to a positive answer to a question, and another node $n_R$ (R for right side) that holds the set of feature vectors that cause a negative answer. At each node of the network, the best question is identified by the evaluation of a probabilistic function that measures the likelihood $P(n_L)$ and $P(n_R)$ of the sets of feature vectors that result from a tentative split.

In order to obtain a number of terminal nodes (or leaves) that allow a reliable parameter estimation, the split-and-merge procedure is controlled by a problem specific threshold $\theta_p$, i.e. a node n is split in two successors $n_L$ and $n_R$, if and only if the gain in likelihood from this split is larger than $\theta_p$:

$$P(n)<P(n_L)+P(n_R)-\theta_p \qquad \text{(eq. 5)}$$

A similar criterion is applied to merge nodes that represent only a small number of feature vectors, and other problem specific thresholds, e.g. the minimum number of feature vectors associated with a node, are used to control the network size as well.

The process stops if a predefined number of leaves is created. All phonetic contexts associated with a leaf cannot be distinguished by the sequence of phone questions that has been asked during the construction of the network, and thus are members of the same equivalence class. Therefore, the corresponding feature vectors are considered to be homogeneous and are associated with a context dependent, single state, continuous density HMM, whose output probability is described by a gaussian mixture model (eq. 4). Initial estimates for the mixture components are obtained by clustering the feature vectors at each terminal node, and finally the forward-backward algorithm known in the state of the art is used to refine the mixture component parameters. It is important to note, that according to this state of the art procedure the decision network initially includes a single node and a single equivalence class only (refer to an important deviation with respect to this feature according to the present invention discussed below), which then iteratively is refined into its final form (or in other words the bootstrapping process actually starts "without" a pre-existing decision network).

In the literature, the customization of a general speech recognizer to a particular domain is known as cross domain modeling. The state of the art in this field is described for instance by R. Singh and B. Raj and R. M. Stern, "Domain adduced state tying for cross-domain acoustic modelling", Proc. of the 6th Europ. Conf. on Speech Communication and Technology, Budapest (1999), and roughly can be divided into two different categories:

1. extrinsic modeling: Here, a recognizer is trained using additional data from a (third) domain with phonetic contexts that are close to the special domain under consideration; and, 2. intrinsic modeling: This approach requires a general purpose recognizer with a rich set of context dependent sub-word models. The adaptation data is used to identify those models that are relevant for a specific domain, which is usually achieved by employing a maximum likelihood criterion.

While in extrinsic modeling one can hope that a better coverage of the application domain results in an improved recognition accuracy, this approach is still time consuming and expensive, because it still requires the collection of a substantial amount of (third domain) training data. On the other hand, intrinsic modeling utilizes the fact that only a small amount of adaptation data is needed to verify the importance of a certain phonetic context. However, in contrast to the present invention, intrinsic cross domain modeling allows only a fall back to coarser phonetic contexts (as this approach consists of a selection of a subset of the decision network and its phonetic context only), and is not able to detect any new phonetic context that is relevant to a new domain but not present in the general recognizer's inventory. Moreover, the approach is successful only if the particular domain to be addressed by intrinsic modelling is already covered (at least to a certain extent) by the acoustic model of the general speech recognizer; or in other words, the particular new domain has to be an extract (subset) of the domain to which the general speech recognizer is already adapted.

4.2 Solution

If, in the following, the specification refers to a speech recognizer adapted to a certain domain, the term "domain" is to be understood as a generic term if not otherwise specified. A domain might refer to a certain language, a multitude of languages, a dialect or a set of dialects, a certain task area or set of task areas for which a speech recognizer might be exploited. For example, a domain can relate to certain areas within the science of medicine, the specific task of recognizing numbers only, and the like.

The invention disclosed herein can utilize the already existing phonetic context inventory of a (general purpose) speech recognizer and some small amount of domain specific adaptation data for both the emphasis of dominant contexts and the creation of new phonetic contexts that are relevant for a given domain. This is achieved by using the speech recognizer's decision network and its corresponding phonetic contexts as a starting point and by re-estimating the decision network and phonetic contexts based on domain-specific training data.

As the extensive decision network and the rich acoustic contexts of the existing speech recognizer are used as a starting point, the architecture of the proposed invention achieves minimization of both the amount of speech data needed for the training of a special domain speech recognizer, as well as the individual end users customization efforts. By upfront generation and adaptation of phonetic contexts towards a particular domain, the invention facilitates the rapid development of data files for speech recognizers with improved recognition accuracy for special applications.

The proposed teaching is based upon an interpretation of the training procedure of a speech recognizer as a two stage process that comprises 1.) the determination of relevant acoustic contexts and 2.) the estimation of acoustic model parameters. Adaptation techniques known the within the state of the art, for example maximum a posteriori adaptation (MAP) or maximum likelihood linear regression (MLLR), are directed only to the speaker dependent re-estimation of the acoustic model parameters ($\omega_{ji}$, $\mu_{ji}$, $\Gamma_{ji}$) to achieve an improved recognition accuracy; that is, these approaches exclusively target the adaptation of the HMM parameters based on training data. Importantly, these approaches leave the phonetic contexts unchanged; that is, the decision network and the corresponding phonetic contexts are not modified by these technologies. In commercially available speech recognizers, these methods are usually applied after gathering some training data from an individual end user.

In a previous teaching of V. Fischer, Y. Gao, S. Kunzmann, M. A. Picheny, "Speech Recognizer for Specific Domains or Dialects", PCT patent application EP 99/02673, it has been shown that upfront adaptation of a general purpose base acoustic model using a limited amount of domain or dialect dependent training data yields a better initial recognition accuracy for a broad variety of end users. Moreover it has been demonstrated by V. Fischer, S. Kunzmann, C. Waast-Ricard, "Method and System for Generating Squeezed Acoustic Models for Specialized Speech Recognizer", European patent application EP 99116684.4, that the acoustic model size can be reduced significantly without a large degradation in recognition accuracy based on a small amount of domain specific adaptation data by selecting a subset of probability density functions (PDFS) being distinctive for the domain.

Orthogonally to these previous approaches, the present invention focuses on the re-estimation of phonetic contexts, or—in other words—the adaptation of the recognizer's sub-word inventory to a special domain. Whereas in any speaker adaptation algorithm, as well as in the above mentioned documents of V. Fischer et al., the phonetic contexts once estimated by the training procedure are fixed, the present invention utilizes a small amount of upfront training data for the domain specific insertion, deletion, or adaptation of phones in their respective context. Thus re-estimation of the phonetic contexts refers to a (complete) recalculation of the decision network and its corresponding phonetic contexts based on the general speech recognizer decision network. This is considerably different from just "selecting" a subset of the general speech recognizer decision network and phonetic contexts or simply "enhancing" the decision network by making a leaf node an interior node by attaching a new sub-tree with new leaf nodes and further phonetic contexts.

The following specification refers to FIG. 1. FIG. 1 is a diagram reflecting the overall structure of the proposed methodology of generating a speech recognizer being tailored to a specific domain and gives an overview of the basic principle of the present invention. Accordingly, the description in the remainder of this section refers to the use of a decision network for the detection and representation of phonetic contexts and should be understood as but an illustration of one implementation of the present invention. The invention suggests starting from a first speech recognizer (1) (in most cases a speaker-independent, general purpose speech recognizer) and a small, i.e. limited, amount of adaptation (training) data (2) to generate a second speech recognizer (6) (adapted based on the training data (2)).

The training data (which is not required to be exhaustive of the specific domain) may be gathered either supervised or unsupervised, through the use of an arbitrary speech recognizer that is not necessarily the same as speech recognizer (1). After feature extraction, the data is aligned against the transcription to obtain a phonetic label for each frame. Importantly, while a standard training procedure according to the state of the art as described above starts the computation of significant phonetic contexts from a single equivalence class that holds all data (a decision network with one node only), the present invention proposes an upfront step that separates the additional data into the equivalence classes provided by the speaker independent, general purpose speech recognizer. That is, the decision network and its corresponding phonetic contexts of the first speech recognizer are used as a starting point to generate a second decision network and its corresponding second phonetic contexts for a second speech recognizer by re-estimating the first decision network and corresponding first phonetic contexts based on domain-specific training data.

Therefore, for that purpose, the phonetic contexts of the existing decision network are first extracted as shown in step (31). The feature vectors and their associated phone context can be passed through the original decision network (3) by asking the phone questions that are stored with each node of the network to extract and to classify (32) the training data's phonetic contexts. As a result, one obtains a partitioning of the adaptation data that already utilizes the phonetic context information of the much larger and more general training corpus of the base system.

Subsequently, the original split-and-merge algorithm for the detection of relevant new domain specific phonetic contexts (4) can be applied resulting in a new, re-estimated (domain specific) decision network and corresponding phonetic contexts. Phone questions and splitting thresholds (refer for instance to eq. 5) may depend on the domain and/or the amount of adaptation data, and thus differ from the thresholds used during the training of the baseline recognizer. Similar to the method described in the introductory section 4.1, the procedure uses a maximum likelihood criterion to evaluate all possible splits of a node and stops if the thresholds do not allow a further creation of domain dependent nodes. This way one is able to derive a new, recalculated set of equivalence classes that can be considered by construction as a domain or dialect dependent refinement of the original phonetic contexts, which further may include, for HMMs associated with the leaf nodes of the re-estimated decision network, a re-adjustment of the HMM parameters (5).

One important benefit from this approach lies in the fact that—as opposed to using the domain specific adaptation data in the original, state of the art (refer for instance to section 4.1 above) decision network growing procedure—the present invention preserves the phonetic context information of the (general purpose) speech recognizer which is used as a starting point. Importantly, and in contrast to cross domain modeling techniques as described by R. Singh et al. (refer to the discussion above), the method of the present invention simultaneously allows the creation of new phonetic contexts that need not be present in the original training material. Rather than create a domain specific HMM inventory from scratch according to the state of the art, which requires the collection of a huge amount of domain-specific training data, the present invention allows the adaptation of the general recognizer's HMM inventory to a new domain based on a small amount of adaptation data.

As the general speech recognizer's "elaborate" decision network with its rich, well-balanced equivalence classes and its context information is exploited as a starting point, the limited, i.e. small, amount of adaptation (training) data suffices to generate the adapted speech recognizer. This saves a significant effort in collecting domain-specific training data. Moreover, a significant speed-up in the adaptation process and an important improvement in the recognition quality of the generated adapted speech recognizer is achieved.

As with the baseline recognizer, each terminal node of the adapted (i.e. generated) decision network defines a context dependent, single state Hidden Markov Model for the specialized speech recognizer. The computation of an initial estimate for the state output probabilities (refer to eq. 4) has to consider both the history of the context adaptation process and the acoustic feature vectors associated with each terminal node of the adapted networks:

A. Phonetic contexts that are unchanged by the adaptation process are modelled by the corresponding gaussian mixture components of the base recognizer.

B. Output probabilities for newly created context dependent HMMs can be modelled either by applying the above-mentioned adaptation methods to the Gaussians of the original recognizer, or—if a sufficient number of feature vectors has been passed to the new terminal node—by clustering of the adaptation data.

Following the above mentioned teaching of V. Fischer et al., "Method and System for Generating Squeezed Acoustic Models for Specialized Speech Recognizer", European patent application EP 99116684.4, the adaptation data may also be used for a pruning of Gaussians in order to reduce memory footprints and CPU time. The teaching of this reference with respect to selecting a subset of HMM states of the general purpose speech recognizer for use as a starting point ("Squeezing") and the teaching with respect to selecting a subset of probability-density-functions (PDFS) of the general purpose speech recognizer for use as a starting point ("Pruning"), both of which are distinctive of the specific domain, are incorporated herein by reference.

There are three additional important aspects of the present invention:

1. The application of the present invention is not limited to the upfront adaptation of domain or dialect-specific speech recognizers. Without any modification, the invention is also applicable in a speaker adaptation scenario where it can augment the speaker dependent re-estimation of model parameters. Unsupervised speaker adaptation, which requires a substantial amount of speaker dependent data, is an especially promising application scenario.

2. The present invention further is not limited to the adaptation of phonetic contexts to a particular domain (taking place once), but may be used iteratively to enhance the general recognizer's phonetic contexts incrementally based upon further training data.

3. If different languages share a common phonetic alphabet, the method also can be used for the incremental and data driven incorporation of a new language into a true multilingual speech recognizer that shares HMMs between languages.

4.3 Application Examples of the Present Invention

Facing the growing market of speech enabled devices that have to fulfill only a limited (application) task, the invention disclosed herein provides an improved recognition accuracy for a wide variety of applications. A first experiment focused on the adaptation of a fairly general speech recognizer for a digit dialing task, which is an important application in the strongly expanding mobile phone market.

The following table reflects the relative word error rates for the baseline system (left), the digit domain specific recognizer (middle), and the domain adapted recognizer (right) for a general dictation and a digit recognition task:

| | baseline | digits | adapted |
|---|---|---|---|
| dictation | 100 | 193.25 | 117.89 |
| digits | 100 | 24.87 | 47.21 |

The baseline system (baseline, refer to the table above) was trained with 20,000 sentences gathered from different German newspapers and office correspondence letters, and uttered by approximately 200 German speakers. Thus, the recognizer uses phonetic contexts from a mixture of different domains, which is the usual method to achieve good phonetic coverage in the training of general purpose, large vocabulary continuous speech recognizers, such as IBM's ViaVoice. The domain specific digit data included approximately 10,000 training utterances that further included up to 12 spoken digits and was used for both the adaptation of the general recognizer (adapted, refer to the table above) according to the teaching of the present invention and the training of a digit specific recognizer (digit, refer to the table above).

The above table gives the (relative) word error rates (normalized to the baseline system) for the baseline system, the adapted phone context recognizer, and the digit specific system. While the baseline system shows the best performance for the general large vocabulary dictation task, it yields the worst results for the digit task. In contrast, the digit specific recognizer performs best on the digit task, but shows unacceptable error rates for the general dictation task. The rightmost column demonstrates the benefits of the context adaptation: while the error rate for the digit recognition task decreases by more than 50 percent, the adapted recognizer still shows a fairly good performance on the general dictation task.

4.4 Further Advantages of the Present Invention

The results presented in the previous section demonstrate that the invention described herein offers further significant advantages in addition to those addressed already within the above specification. From the discussion of the above outlined example, with respect to a general speech recognizer adapted to specific domain of a digit recognition task, it has been demonstrated that the present teaching is able to significantly improve the recognition rate within a given target domain.

It has to be pointed out (as also made apparent by the above mentioned example) that the present invention at the same time avoids an unacceptable decrease of recognition accuracy in the original recognizer's domain. As the present invention uses the existing decision network and acoustic contexts of a first speech recognizer as a starting point, very little additional domain specific or dialect data, which is inexpensive and easy to collect, suffices to generate a second speech recognizer. Also due to this chosen starting point, the proposed adaptation techniques are capable of reducing the time for the training of the recognizer significantly.

Finally, the invention allows the generation of specialized speech recognizers requiring reduced computation resources, for instance in terms of computing time and memory footprints. Accordingly, the invention disclosed herein is thus suited for the incremental and low cost integration of new application domains into any speech recognition application. It may be applied to general purpose, speaker independent speech recognizers as well as to further adaptation of speaker dependent speech recognizers. Still, the invention disclosed herein can be embodied in other specific forms without departing from the spirit or essential attributes thereof. Accordingly, reference should be made to the following claims, rather than to the foregoing specification, as indicating the scope of the invention.

What is claimed is:

1. A computerized method of automatically generating from a first speech recognizer a second speech recognizer, said first speech recognizer comprising a first acoustic model with a first decision network and corresponding first phonetic contexts, and said second speech recognizer being adapted to a specific domain, said method comprising:

based on said first acoustic model, generating a second acoustic model with a second decision network and corresponding second phonetic contexts for said second speech recognizer by re-estimating said first decision network and said corresponding first phonetic contexts based on domain-specific training data, wherein said first decision network and said second decision network utilize a phonetic decision free to perform speech recognition operations, wherein the number of nodes in the second decision network is not fixed by the number of nodes in the first decision network, and wherein said re-estimating comprises partitioning said training data using said first decision network of said first speech recognizer.

2. A computerized method of automatically generating from a first speech recognizer a second speech recognizer, said first speech recognizer comprising a first acoustic model wit a first decision network and corresponding first phonetic contexts, and said second speech recognizer being adapted to a specific domain, said method comprising:

based on said first acoustic model, generating a second acoustic model with a second decision network and corresponding second phonetic contexts for said second speech recognizer by re-estimating said first decision network and said corresponding first phonetic contexts based on domain-specific training data, wherein said first decision network and said second decision network utilize a phonetic decision tree to perform speech recognition operations, wherein the number of nodes in the second decision network is not fixed by the number of nodes in the first decision network, wherein said domain-specific training data is of a limited amount, and wherein the generating step further comprises the steps of:

identifying at least one acoustic context from the domain-specific training data; and adding a node to the second decision network for the identified context independent of other generating step operations.

3. The method of claim 1, said partitioning stop comprising:

passing feature vectors of said training data through said first decision network and extracting and classifying phonetic contexts of said training data.

4. The method of claim 3, said re-estimating further comprising:

detecting domain-specific phonetic contexts by executing a split-and-merge methodology based on said partitioned training data for re-estimating said first decision network and said first phonetic contexts.

5. The method of claim 4, wherein control parameters of said split-and-merge methodology are chosen specific to said domain.

6. The method of claim 4, wherein for Hidden-Markov-Models (HMMs) associated with leaf nodes of said second decision network, said re-estimating comprises re-adjusting HMM parameters corresponding to said HMMs.

7. The method of claim 6, wherein said HMMs comprise a set of states and a set of probability-density-functions (PDFS) assembling output probabilities for an observation of a speech frame in said states, and wherein said re-adjusting step is preceded by:

selecting from said states a subset of states being distinctive of said domain; and selecting from said set of PDFS a subset of PDFS being distinctive of said domain.

8. The method of claim 6, wherein said method is executed iteratively for additional training data.

9. The method of claim 7, wherein said method is executed iteratively for additional training data.

10. The method of claim 6, wherein said first speech recognizer is a general purpose speech recognizer, and wherein the second speech recognizer is a speaker independent speech recognizer.

11. The method of claim 6, wherein said first and said second speech recognizers are speaker-dependent speech recognizers and said training data is additional speaker-dependent training data.

12. The method of claim 6, wherein said first speech recognizer is a speech recognizer of at least a first language and said domain specific training data relates to a second language and said second speech recognizer is a multilingual speech recognizer of said second language and said at least first language.

13. The method of claim 1, wherein said domain is selected from the group consisting of a language, a set of languages, a dialect, a task area, and a set of task areas.

14. A machine-readable storage, having stored thereon a computer program having a plurality of code sections executable by a machine for causing the machine to automatically generate from a first speech recognizer a second speech recognizer, said first speech recognizer comprising a first acoustic model with a first decision network and corresponding first phonetic contexts, and said second speech recognizer being adapted to a specific domain, said machine-readable storage causing the machine to perform the steps of:

based on said first acoustic model, generating a second acoustic model with a second decision network and corresponding second phonetic contexts for said second speech recognizer by re-estimating said first decision network and said corresponding first phonetic contexts based on domain-specific training data, wherein said first decision network and said second decision network utilize a phonetic decision tree to perform speech recognition operations, wherein the number of nodes in the second decision network is not fixed by the number of nodes in the first decision network, and wherein said re-estimating comprises partitioning said training data using said first decision network of said first speech recognizer.

15. A machine-readable storage, having stored thereon a computer program having a plurality of code sections executable by a machine for causing the machine to automatically generate from a first speech recognizer a second speech recognizer, said first speech recognizer comprising a first acoustic model with a first decision network and corresponding first phonetic contexts, and said second speech recognizer being adapted to a specific domain, said machine-readable storage causing the machine to perform the steps of:

based on said first acoustic model, generating a second acoustic model with a second decision network and corresponding second phonetic contexts for said second speech recognizer by re-estimating said first decision network and said corresponding first phonetic contexts based on domain-specific training data, wherein said first decision network and said second decision network utilize a phonetic decision tree to perform speech recognition operations, wherein the number of nodes in the second decision network is not fixed by the number of nodes in the first decision network, wherein said domain-specific training data is of a limited amount, and wherein the generating step further comprises the steps of:

identifying at least one acoustic context from the domain-specific training data; and adding a node to the second decision network for the identified context independent of other generating step operations.

16. The machine-readable storage of claim 14, said partitioning step comprising:

passing feature vectors of said training data through said first decision network and extracting and classifying phonetic contexts of said training data.

17. The machine-readable storage of claim 16, said re-estimating further comprising:

detecting domain-specific phonetic contexts by executing a split-and-merge methodology based on said partitioned training data for re-estimating said first decision network and said first phonetic contexts.

18. The machine-readable storage of claim 17, wherein control parameters of said split-and-merge methodology are chosen specific to said domain.

19. The machine-readable storage of claim 17, wherein for Hidden-Markov-Models (HMMs) associated with leaf nodes of said second decision network, said re-estimating comprises re-adjusting HMM parameters corresponding to said HMMs.

20. The machine-readable storage of claim 19, wherein said HMMs comprise a set of states and a set of probability-density-functions PDFS) assembling output probabilities for an observation of a speech frame in said states , and wherein said re-adjusting step is preceded by:

selecting from said states a subset of states being distinctive of said domain; and selecting from said set of PDFS a subset of PDFS being distinctive of said domain.

21. The machine-readable storage of claim 19, wherein said method is executed iteratively for additional training data.

22. The machine-readable storage of claim 20, wherein said method is executed iteratively for additional training data.

23. The machine-readable storage of claim 19, wherein said first speech recognizer is a general purpose speech recognizer, and wherein the second speech recognizer is a speaker independent speech recognizer.

24. The machine-readable storage of claim 19, wherein said first and said second speech recognizers are speaker-dependent speech recognizers and said training data is additional speaker-dependent training data.

25. The machine-readable storage of claim 19, wherein said first speech recognizer is a speech recognizer of at least a first language and said domain specific training data relates to a second language and said second speech recognizer is a multi-lingual speech recognizer of said second language and said at least first language.

26. The machine-readable storage of claim 14, wherein said domain is selected from the group consisting of a language, a set of languages, a dialect, a task area, and a set of task areas.

27. A computerized method of generating a second speech recognizer comprising the steps of:

identifying a first speech recognizer of a first domain comprising a first acoustic model with a first decision network and corresponding first phonetic contexts;

receiving domain-specific training data of a second domain; and based on the first speech recognizer and the domain-specific training data, generating a second acoustic model of said first domain and said second domain comprising a second acoustic model with a second decision network and corresponding second phonetic contexts, wherein the first domain comprises at least a first language, wherein the second domain comprises at least a second language, and wherein the second speech recognizer is a multi-lingual speech recognizer.

28. The computerized method of claim 27, wherein the first domain is a general purpose domain, and wherein the second domain comprises at least one dialect.

29. The computerized method of claim 27, wherein the first domain is a general purpose domain, and wherein the second domain comprises at least one task area.

* * * * *